(12) United States Patent
Ueda et al.

(10) Patent No.: US 9,871,987 B2
(45) Date of Patent: Jan. 16, 2018

(54) IMAGE PICKUP ELEMENT AND IMAGE PICKUP APPARATUS

(71) Applicant: CANON KABUSHIKI KAISHA, Tokyo (JP)

(72) Inventors: Toshiharu Ueda, Machida (JP); Teruyuki Okado, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 15/061,508

(22) Filed: Mar. 4, 2016

(65) Prior Publication Data
US 2016/0261814 A1 Sep. 8, 2016

(30) Foreign Application Priority Data

Mar. 5, 2015 (JP) ................................. 2015-044018

(51) Int. Cl.
| | | |
|---|---|---|
| H04N 5/378 | (2011.01) |
| G02B 5/20 | (2006.01) |
| H04N 5/225 | (2006.01) |
| H04N 5/232 | (2006.01) |
| H04N 5/369 | (2011.01) |
| G02B 7/34 | (2006.01) |
| G02B 3/00 | (2006.01) |

(52) U.S. Cl.
CPC ........... *H04N 5/378* (2013.01); *G02B 3/0006* (2013.01); *G02B 5/201* (2013.01); *G02B 7/34* (2013.01); *H04N 5/2254* (2013.01); *H04N 5/23212* (2013.01); *H04N 5/23245* (2013.01); *H04N 5/3696* (2013.01)

(58) Field of Classification Search
None
See application file for complete search history.

(56) References Cited

U.S. PATENT DOCUMENTS 4,528,595 A * 7/1985 Eouzan .................. H04N 9/045
257/443
2015/0256778 A1* 9/2015 Kusaka .................. G03B 13/36
348/302

FOREIGN PATENT DOCUMENTS

JP 2008067241 A * 3/2008
JP 2013-106194 A 5/2013

* cited by examiner

*Primary Examiner* — Roberto Velez
*Assistant Examiner* — Quan Pham
(74) *Attorney, Agent, or Firm* — Canon U.S.A., Inc. IP Division

(57) ABSTRACT

In an image pickup element, a plurality of unit pixels constituted by one micro lens and a photodiode arranged underneath the micro lens are arranged in rows and columns. The image pickup element includes first unit pixels in which a plurality of photodiodes are arranged underneath one micro lens, second unit pixels different from the first unit pixels, m first output lines per column from which signals of the first unit pixels are output, and n second output lines per column from which signals of the second unit pixels are output.

10 Claims, 12 Drawing Sheets

IMAGE PICKUP ELEMENT AND IMAGE PICKUP APPARATUS

BACKGROUND OF THE INVENTION

Field of the Invention

One disclosed aspect of the embodiments relates to an image pickup element and an image pickup apparatus.

Description of the Related Art

Up to now, an image pickup element has been proposed in which one micro lens and two photodiodes (hereinafter, will be referred to as PDs) are provided in one pixel, and the respective PDs in the same pixel receive light of different pupil planes of an imaging lens as described in Japanese Patent Laid-Open No. 2013-106194. In an image pickup apparatus using the above-described image pickup element, it is possible to perform focus detection of a phase difference system from signals of the respective PDs.

Since an image signal for viewing can be generated by adding the signals of the two PDs with each other, it is possible to perform the focus detection of the phase difference system at the same time as the image pickup by using the one image pickup element.

However, since the signals of the two PDs are individually read out according to the configuration in which the two PDs are provided in the one pixel as described in Japanese Patent Laid-Open No. 2013-106194, a problem occurs that a reading time takes approximately twice as long as that of a configuration in which one PD is provided in one pixel.

SUMMARY OF THE INVENTION

One disclosed aspect of the embodiments has been made in view of the above-described problems, and a signal reading time is shortened in a configuration in which image pickup is performed at the same time as phase difference detection by using one image pickup element.

An image pickup element according to an aspect of the embodiments includes: a pixel array in which a plurality of first unit pixels each including M photoelectric conversion units (M is a natural number higher than or equal to 2) and a plurality of second unit pixels each including N photoelectric conversion units (N is a natural number lower than M) are arranged in rows and columns; a first column output line arranged for each column of the pixel array from which signals of the first unit pixels are output; and a second column output line that is different from the first column output line and arranged for each column of the pixel array from which signals of the second unit pixels are output, in which the number of the second column output lines per column is lower than the number of the first column output lines per column.

Further features of the disclosure will become apparent from the following description of exemplary embodiments with reference to the attached drawings.

DESCRIPTION OF THE EMBODIMENTS

Hereinafter, exemplary embodiments will be described in detail with reference to the accompanying drawings.

First Exemplary Embodiment

Figure 1:
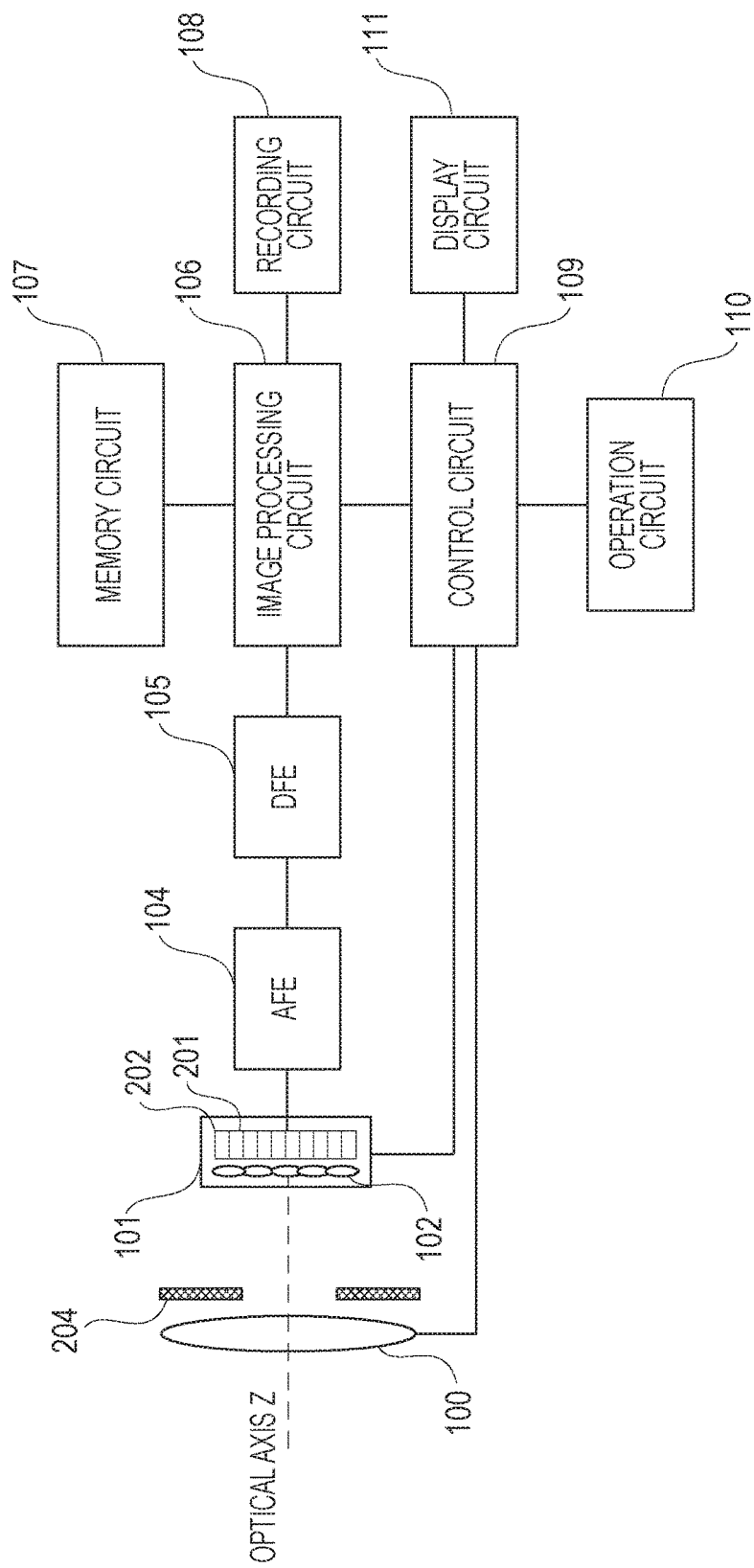
FIG. 1 is a block diagram of an image pickup apparatus according to an exemplary embodiment.

FIG. 1 is a block diagram of an image pickup apparatus according to an exemplary embodiment. In FIG. 1, light that has passed through an imaging lens 100 is imaged in a neighborhood of a focus position thereof. The imaging lens 100 is provided with a focus driving mechanism (not illustrated) in which an operation for taking the focus is performed in accordance with a focus detection (range measurement) result. An image pickup element 101 is a solid-state image element represented by a CMOS sensor or the like. The image pickup element 101 is provided with a micro lens 102 and photodiodes 201 and 202.

An analog signal processing circuit (AFE) 104 performs correlated double sampling processing, signal amplification, reference level adjustment, analog/digital (A/D) conversion processing, and the like on an image signal output from the image pickup element 101. It should be noted that respective configurations in the AFE 104 may be built in the image pickup element 101. A digital signal processing circuit (DFE) 105 performs digital image processing such as reference level adjustment on an image signal output from the analog signal processing circuit 104.

An image processing circuit 106 applies correlation computation of an A image output and a B image output which will be described below, focus detection, predetermined image processing, defect correction, and the like to an image signal output from the digital signal processing circuit 105. A memory circuit 107 is a nonvolatile memory. A recording circuit 108 records and holds the image signal output from the image processing circuit 106 or the like in a recording medium such as a memory card.

A control circuit 109 drives and controls the entire image pickup apparatus such as the image pickup element 101 and the image processing circuit 106. An operation circuit 110 accepts a signal from an operation member provided to the image pickup apparatus and reflects a command of a user with respect to the control circuit 109. As an example, a control is performed to switch general shooting modes (such as still image mode, video mode, high speed shooting mode, and low speed shooting mode) and the like. A display circuit 111 displays an image after shooting, a live view image, various setting screens, and the like.

Figure 2:
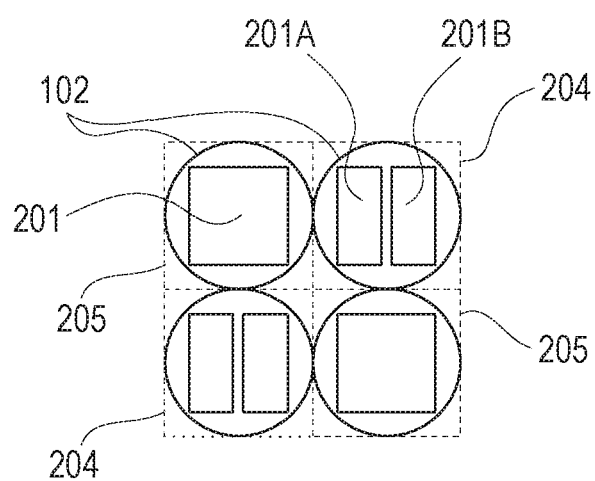
FIG. 2 is a pixel array diagram of an image pickup element according to an exemplary embodiment.

FIG. 2 illustrates the image pickup element 101 as seen from an optical axis Z direction of FIG. 1. With reference to FIG. 2, a configuration of the image pickup element 101 will be described. As illustrated in FIG. 2, the image pickup element 101 is provided with a pixel array in which unit pixels are arranged at substantially even intervals in row and column directions. It should be noted that only pixels in two rows and two columns are illustrated in the pixel array of FIG. 2, but in actuality, further more unit pixels are arranged in the row and column directions. In addition, according to the present exemplary embodiment, an element constituted together with the one micro lens 102 is defined as the unit pixel corresponding to the single pixel.

Herein, two photodiodes including a photodiode 201A and a photodiode 201B divided with respect to the one micro lens 102 are arranged in a row direction (X axis direction) in a first unit pixel 204. In addition, one photodiode 201 is arranged with respect to the one micro lens 102 in a second unit pixel 205. As illustrated in FIG. 2, the first unit pixel 204 and the second unit pixel 205 are alternately arranged in the row direction and the column direction.

One of red, blue, and green color filters is arranged on top of the respective unit pixels. In order that sensitivity becomes relatively high, the green color filter through which green light transmits the most is arranged on the first unit pixel 204. The red color filter through which red light transmits the most or the blue color filter through which blue light transmits the most is arranged on the second unit pixel 205. That is, the first unit pixel 204 and the second unit pixel 205 include color filters having different spectral transmittance. The color filters of the respective colors are regularly arranged such that a Bayer pattern is established in the configuration of the four pixels illustrated in FIG. 2.

Figure 3:
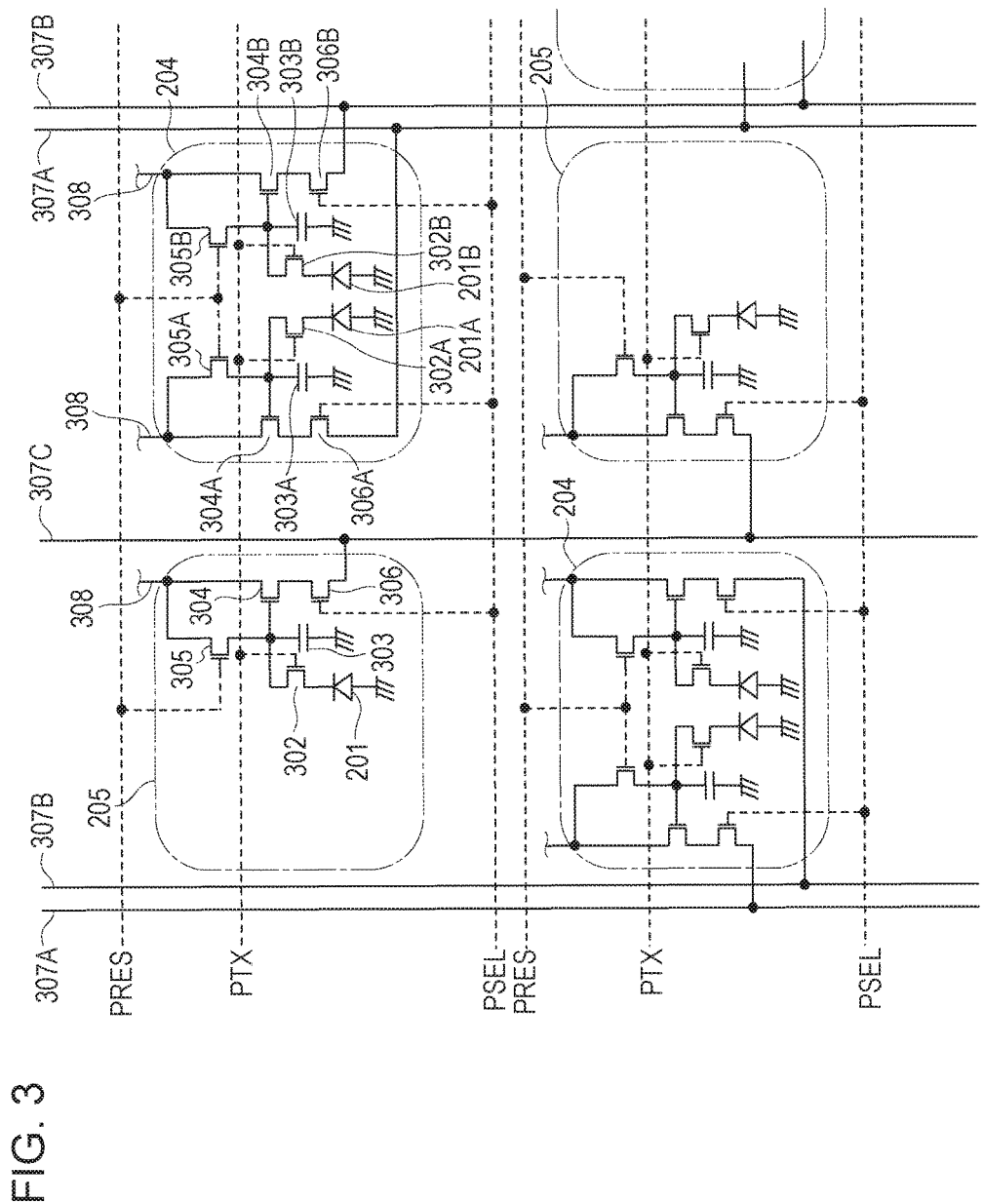
FIG. 3 is a circuit diagram illustrating an internal configuration of a unit pixel according to a first exemplary embodiment.

Next, the configurations of the first unit pixel 204 and the second unit pixel 205 will be described with reference to FIG. 3. FIG. 3 is a circuit diagram illustrating a configuration of the unit pixel according to the first exemplary embodiment. FIG. 3 also illustrates only the pixels in the two rows and two columns similarly as in FIG. 2, but in actuality, further more unit pixels are arranged.

The first unit pixel 204 is provided with the first photodiode 201A, the second photodiode 201B, a first transfer switch 302A, and a second transfer switch 302B. The first unit pixel 204 is also provided with a first floating diffusion area 303A, a second floating diffusion area 303B, a first amplification unit 304A, and a second amplification unit 304B. The first unit pixel 204 is further provided with a first reset switch 305A, a second reset switch 305B, a first selection switch 306A, and a second selection switch 306B.

The photodiodes 201A and 201B function as photoelectric conversion units configured to receive light that has passed through the same micro lens and generate signal charges in accordance with the amount of received light. The first unit pixel 204 includes M photoelectric conversion units. Herein, an example will be described in which the first unit pixel 204 includes two photoelectric conversion units, but it is sufficient when M is a natural number higher than or equal to 2. ON and OFF of the transfer switches 302A and 302B are controlled by a transfer pulse signal PTX, and charges generated in the photodiodes 201A and 201B are transferred to the respectively corresponding floating diffusion areas 303A and 303B.

The floating diffusion areas 303A and 303B function as charge voltage conversion units configured to respectively temporarily hold the charges transferred from the photodiodes 201A and 201B and convert the held charges into voltage signals.

The amplification units 304A and 304B are MOS transistors and function as source follower amplifiers by being connected to a constant current source 1202 of FIG. 4 which will be described below via column output lines 307A and 307B. The amplification units 304A and 304B amplify the voltage signals based on the charges held in the floating diffusion areas 303A and 303B to be output as pixel signals.

Herein, according to the present exemplary embodiment, a pixel signal based on the charges generated in the photodiode 201A and transferred to the floating diffusion area 303A is referred to as an A image signal. In addition, a pixel signal based on the charges generated in the photodiode 201B and transferred to the floating diffusion area 303B is referred to as a B image signal.

ON and OFF of the reset switches 305A and 305B are controlled by a reset pulse signal PRES, and potentials of the floating diffusion areas 303A and 303B are reset to a reference potential VDD supplied from a common power supply 308.

ON and OFF of the selection switches 306A and 306B are controlled by a selection switch control signal PSEL, and the A image signal and the B image signal amplified by the amplification units 304A and 304B are respectively output to the column output lines 307A and 307B.

The column output lines 307A and 307B are provided for each column of the pixel array and are first column output lines connected to the first unit pixels 204 in one column. It should be noted that the column output lines 307A and 307B are commonly used by a plurality of first unit pixels 204 in different rows and adjacent columns. In FIG. 3, the column output lines 307A and 307B are commonly used by the first unit pixel 204 in the first row and the second column and the first unit pixel 204 in the second row and the third column.

The second unit pixel 205 includes a photodiode 201, a transfer switch 302, a floating diffusion area 303, an amplification unit 304, a reset switch 305, and a selection switch 306. Basically, the second unit pixel 205 is similar to the photodiode and the circuit configuration on one side of the first unit pixel 204, and the pixel signal is output to a column output line 307C.

The photodiode 201 functions as a photoelectric conversion unit configured to receive light that has passed through the micro lens and generate signal charges in accordance with the amount of received light. The second unit pixel 205 includes N photoelectric conversion units. Herein, an example will be described in which the second unit pixel 205 includes one photoelectric conversion unit, but it is sufficient when N is a natural number lower than M.

The column output line 307C is a second column output line connected to the second unit pixel 205, and the second column output line is arranged as a column output line different from the above-described first column output line. It should be noted that the column output line 307C is commonly used by a plurality of second unit pixel 205 in different rows and adjacent columns. In FIG. 3, the column output line 307C is commonly used by the second unit pixel 205 in the first row and the first column and the second unit pixel 205 in the second row and the second column.

The amplification unit 304 is a MOS transistor and functions as a source follower amplifier by being connected to the constant current source 1202 of FIG. 4 which will be described below via the column output line 307C similarly as in the first unit pixel 204. The amplification unit 304 amplifies the voltage signal based on the charges held in the floating diffusion area 303 to be output as the pixel signal.

That is, the first unit pixel 204 is connected to the (two in this example) first column output lines corresponding to the number of amplification units in the pixel (two in this example). The second unit pixel 205 is connected to the (one in this example) second column output line corresponding to the number of amplification units in the pixel (one in this example).

According to the present exemplary embodiment, the number of the first column output lines per column to which the first unit pixels 204 are connected is m, and the number of the second column output lines per column to which the second unit pixels 205 are connected is n, such that a relationship between m and n satisfies m>n. That is, the number of the second column output lines per column is lower than the number of the first column output lines per column.

In addition, it is possible to reduce the number of the first column output lines 307A and 307B to be arranged by adopting the configuration in which the plurality of first unit pixels 204 in the different rows and the adjacent columns commonly use the first column output lines 307A and 307B. Similarly, it is possible to reduce the number of the second output lines 307C to be arranged by adopting the configuration in which the plurality of second unit pixels 205 in the different rows and the adjacent columns commonly use the second output line 307C.

It should be noted that, according to the present exemplary embodiment, each unit pixel is provided with the floating diffusion area and the amplification unit (source follower amplifier) as illustrated in FIG. 3, but the disclosure is not limited to the above-described configuration. For example, a configuration may be adopted in which the floating diffusion area and the amplification unit are commonly used by unit pixels in rows where reading times are different from each other.

Figure 11:
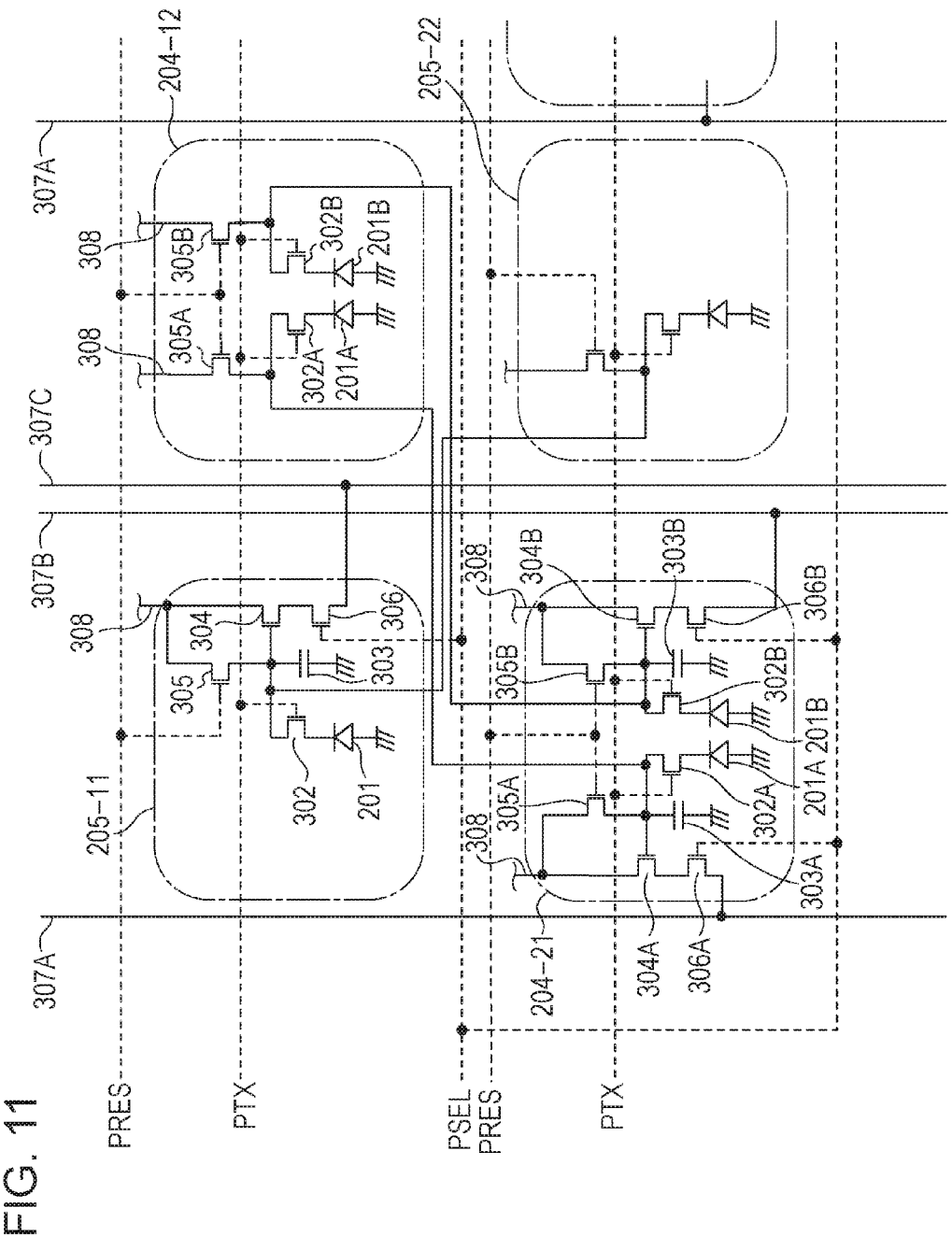
FIG. 11 is a circuit diagram illustrating an internal configuration of the unit pixel according to the first exemplary embodiment.

Specifically, a similar effect can also be attained by adopting a configuration as illustrated in FIG. 11. That is, the first unit pixel 204-12 in the first row and the first unit pixel 204-21 in the second row commonly use the floating diffusion areas 303A and 303B, the amplification units 304A and 304B, and the selection switches 306A and 306B. In addition, the second unit pixel 205-11 in the first row and the second unit pixel 205-22 in the second row commonly use the floating diffusion area 303, the amplification unit 304, and the selection switch 306.

Figure 4:
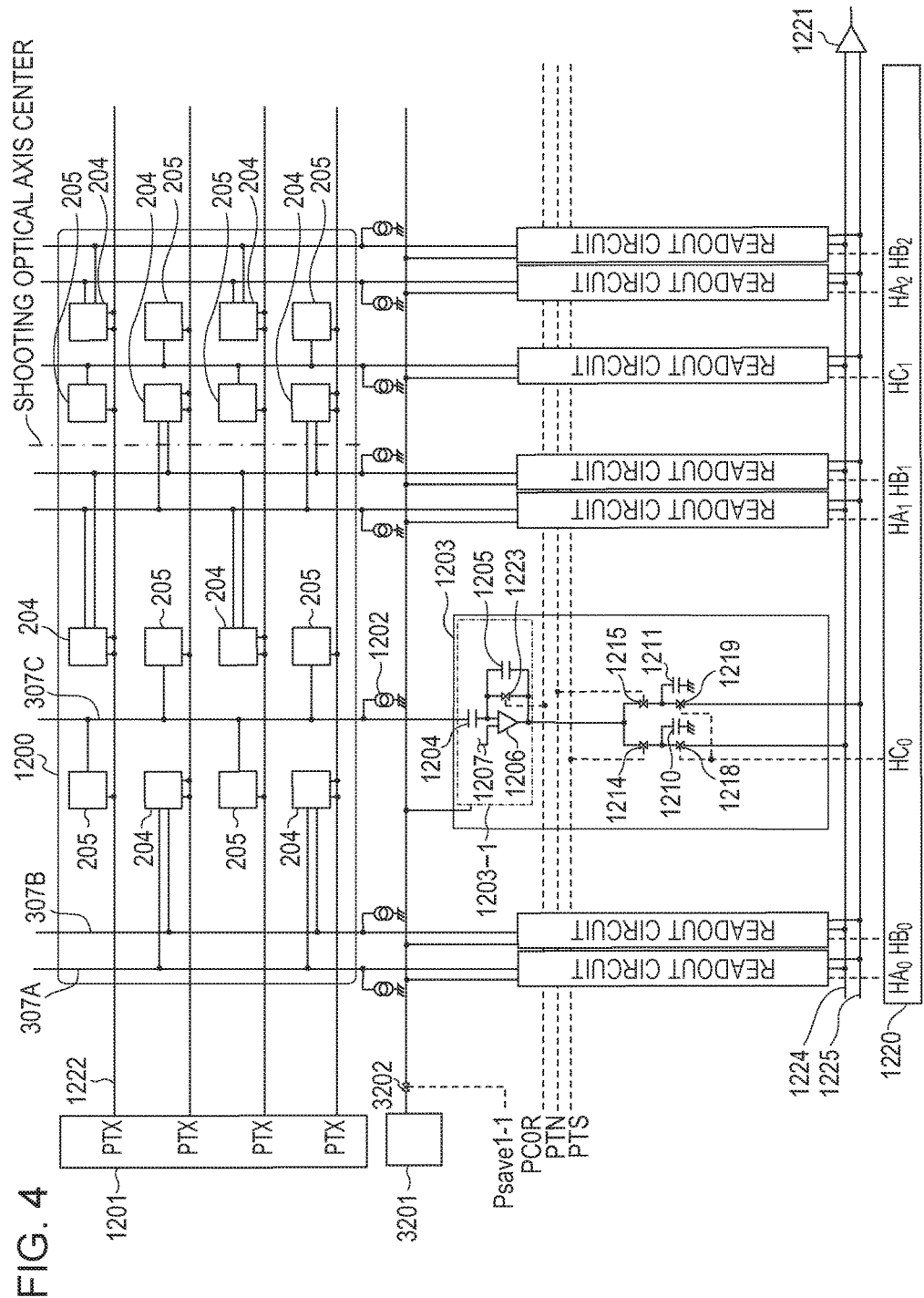
FIG. 4 illustrates a circuit configuration of the image pickup element according to the first exemplary embodiment.

Next, FIG. 4 illustrates an example circuit configuration of the image pickup element according to the first exemplary embodiment. A plurality of unit pixels (the first unit pixels 204 and the second unit pixels 205 described with reference to FIG. 2 and FIG. 3) are arranged in rows and columns in a pixel area 1200. It should be noted that, herein, 4×4 pixels are illustrated to simplify the explanation, but in actuality, further more unit pixels are arranged.

A vertical shift register 1201 performs vertical scanning by transmitting the driving pulse for each pixel in the respective rows. It should be noted that, for simplification, FIG. 4 illustrates only a driving signal line 1222 to which the transfer pulse signal PTX is transmitted, but in actuality, a plurality of driving signal lines to which the reset pulse signal PRES, the selection switch control signal PSEL, and the like are transmitted are also connected for each row.

The transfer pulse signal PTX transmitted from the vertical shift register 1201 controls ON and OFF of the transfer switches 302, 302A, and 302B.

The first unit pixel 204 outputs the A image signal and the B image signal respectively obtained from the photodiodes 201A and 201B to the column output lines 307A and 307B, respectively, and the second unit pixel 205 outputs the pixel signal obtained from the photodiode 201 to the column output line 307C.

The signals from the respective pixels are input to readout circuits 1203 arranged in the individual columns via the column output lines 307A, 307B, and 307C. The signals processed in the readout circuit 1203 are sequentially output to an output amplifier 1221 by a horizontal shift register 1220 configured to perform horizontal scanning. The constant current source 1202 is connected to the column output lines 307A, 307B, and 307C.

The readout circuit 1203 is provided for each column output line in each column. Since the configurations of the respective readout circuits 1203 are common to one another, only one circuit will be illustrated in detail in FIG. 4. A column amplification circuit 1203-1 is provided with a clamp capacitance 1204, a feedback capacitance 1205, a column amplifier 1206, a reference voltage source 1207, and a switch 1223.

The column amplifier 1206 amplifies a signal voltage on a column output line 307. The reference voltage source 1207 supplies a reference voltage Vref of the column amplifier 1206. The switch 1223 is controlled by a PC0R signal. When the switch 1223 is turned on, both ends of the feedback capacitance 1205 are short-circuited. In a case where a capacitance of the clamp capacitance 1204 is set as C0 and a capacitance of the feedback capacitance 1205 is set as Cf, an amplification factor of the column amplifier 1206 is set as C0/Cf.

A power supply circuit 3201 supplies power to the column amplification circuit 1203-1. A voltage supplied from the power supply circuit 3201 is supplied to each of the column amplification circuits 1203-1 via a power supply switch 3202. ON and OFF of the power supply switch 3202 are controlled by a Psave1-1 signal.

Specifically, in a case where the Psave1-1 signal is a Low level, the power supply to the column amplification circuit 1203-1 is performed, and in a case where the Psave1-1 signal is a High level, the power supply to the column amplification circuit 1203-1 is interrupted to save power.

A capacitance 1210 and a capacitance 1211 hold signal voltages. A switch 1214 and a switch 1215 respectively control writing to the capacitance 1210 and the capacitance 1211. ON and OFF of the switch 1214 are controlled by a PTS signal, and ON and OFF of the switch 1215 are controlled by a PTN signal.

ON and OFF of a switch 1218 and a switch 1219 are controlled by a PH signal from the horizontal shift register 1220. Then, when the switch 1218 is turned on, the signal written in the capacitance 1210 is output to the output amplifier 1221 via a common output line 1224. When switch 1219 is turned on, the signal written in the capacitance 1211 is output to the output amplifier 1221 via a common output line 1225.

Figure 5:
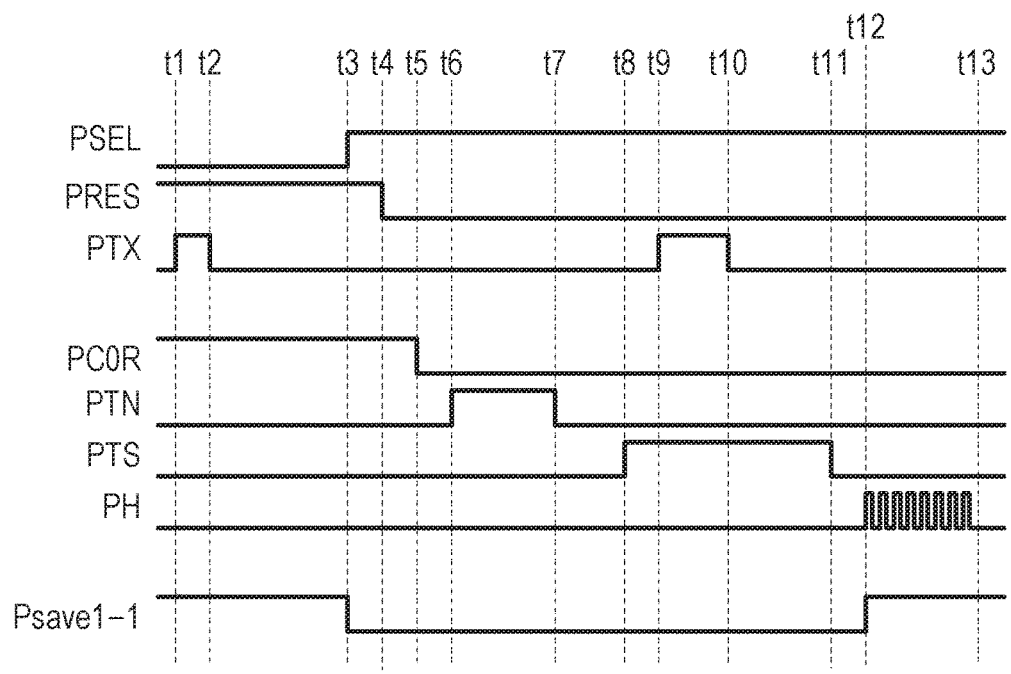
FIG. 5 is a timing chart illustrating a driving method according to the first exemplary embodiment.

Next, a driving method of reading out the pixel signal will be described with reference to FIG. 5. FIG. 5 illustrates a driving sequence for one row.

First, the selection switch control signal PSEL is set to the Low level to turn off the selection switches 306, 306A, and 306B, and the reset pulse signal PRES is set to the High level to turn on the reset switches 305, 305A, and 305B. Then, the floating diffusion areas 303, 303A, and 303B are reset.

At a time T=t1, the transfer pulse signal PTX is set to the High level to turn on the transfer switches 302, 302A, and 302B and reset the photodiodes 201, 201A, and 201B. At the time T=t2, the transfer pulse signal PTX is set to the Low level to cancel the reset state and start accumulation of light charges in the photodiodes 201, 201A, and 201B.

After the accumulation is performed for a predetermined time, at the time T=t3, the Psave1-1 signal is set to the Low level, and the power supply to the column amplification circuit 1203-1 of the readout circuit 1203 is performed. In addition, the selection switch control signal PSEL is set to the High level to turn on the selection switches 306, 306A, and 306B. At the time T=t4, the reset pulse signal PRES is set to the Low level to turn off the reset switch 305 and cancel resetting of the floating diffusion areas 303, 303A, and 303B. The potentials of the floating diffusion areas 303, 303A, and 303B at this time are amplified by the amplification units 304, 304A, and 304B and read out as reset signals to the column output lines 307A, 307B, and 307C to be input to the readout circuit 1203.

In the readout circuit 1203, when the reset signal is input, the PC0R signal is set to the High level to turn on the switch 1223, and a state is established in which the column amplifier 1206 buffers the reference voltage Vref supplied from the reference voltage source 1207. Then, the feedback capacitance 1205 is reset, and also, the reset signal is clamped in the clamp capacitance 1204.

Thereafter, at the time T=t5, the PC0R signal is set to the Low level to turn off the switch 1223, and at the time T=t6, the PTN signal is set to the High level to turn on the switch 1215, so that the reset signal is written in the capacitance 1211. Thereafter, at the time T=t7, the PTN signal is set to the Low level to turn off the switch 1215.

Next, at the time T=t8, the PTS signal is set to the High level to turn on the switch 1214. Subsequently, at the time T=t9, the transfer pulse signal PTX is set to the High level to turn on the transfer switches 302, 302A, and 302B. Then, the light charges of the photodiodes 201, 201A, and 201B are transferred to the floating diffusion areas 303, 303A, and 303B.

Then, the potentials based on the charges of the photodiodes 201, 201A, and 201B which are transferred to the floating diffusion areas 303, 303A, and 303B are amplified by the amplification units 304, 304A, and 304B. The pixel signals amplified by the amplification units 304, 304A, and 304B are output to the column output lines 307A, 307B, and 307C to be input to the readout circuit 1203. Then, the pixel signal amplified by the column amplifier 1206 of the readout circuit 1203 is written in the capacitance 1210.

Thereafter, at the time T=t10, the transfer pulse signal PTX is set to the Low level to turn off the transfer switches 302, 302A, and 302B, and at the time T=t11, the PTS signal is set to the Low level to turn off the switch 1214.

Subsequently, at the time T=t12, the Psave1-1 signal is set to the High level to save power by interrupting the power supply to the column amplification circuit 1203-1 of the readout circuit 1203, and also at the time T=t12 to t13, the horizontal scanning is performed. That is, the driving pulse PH of the horizontal shift register 1220 is sequentially set to the Low level→the High level→the Low level for each readout circuit to perform a control such that the switches 1218 and 1219 are sequentially turned off→on→off.

As a result, the reset signals held in the capacitance 1211 are sequentially read out to the common output line 1224, and also the pixel signals held in the capacitance 1210 are sequentially read out to the common output line 1225. Then, a difference (difference voltage) between the pixel signals and the reset signals which are read out for one row is output from the output amplifier 1221. When the above-described operation is repeatedly performed for all of the rows, it is possible to perform the accumulation and the signal readout of all of the pixels. It should be noted that the common output lines 1224 and 1225 are reset to the reference potential by the reset switch that is not illustrated in the drawing each time the signals in each column are read out.

It should be noted that each of the first unit pixels 204 separately outputs the signals of the M photoelectric conversion units as an A image output and a B image output. While the A image output and the B image output obtained from the first unit pixel 204 are used, the computation of the phase difference detection for the focus detection is performed by the image processing circuit 106 and the like in the subsequent stage. Furthermore, the image data is generated while composite processing (addition processing) of the A image output and the B image output is performed to be used together with the output obtained from the second unit pixel 205.

According to the present exemplary embodiment, in odd-numbered rows (the first row, the third row, and the like), the pixel signals are output to the column output lines 307A and 307B from the first unit pixels 204 situated on the left side thereof, and the pixel signals are output to the column output line 307C from the second unit pixels 205 situated on the right side thereof. On the other hand, in even-numbered rows (the second row, the fourth row, and the like), the pixel signals are output to the column output lines 307A and 307B from the first unit pixels 204 situated on the right side thereof, and the pixel signals are output to the column output line 307C from the second unit pixels 205 situated on the left side thereof.

With the above-described configuration, alignment processing is performed on the read pixel outputs by a circuit in a subsequent stage such as the digital signal processing circuit 105 such that displacement as an image does not occur. It should be noted however that this alignment processing is preferably performed after corrections related to the column output line and the readout circuit (for example, gain correction for each column circuit). As a result, it is possible to easily correct hardware variations.

As described above, since the readout of the A image signal and the B image signal from the first unit pixel and the readout of the image pickup signal from the second unit pixel can be executed in parallel, it is possible to significantly improve the readout speed in the configuration in which the unit pixel includes the plurality of photodiodes.

In addition, while the configuration is adopted in which the number of column output lines of the second unit pixel is lower than that of column output lines of the first unit pixel, the area occupied by the column output lines is reduced, and the area occupied by the photodiode is accordingly expanded, so that the light reception characteristic is improved. Furthermore, the green color filter is arranged on the first unit pixel that uses the addition signal of the two photodiodes as the image pickup signal, and the sensitivity of the first unit pixel is relatively increased, so that it is possible to reduce the influence of noise.

Second Exemplary Embodiment

According to the first exemplary embodiment, since the second unit pixel has the configuration in which the photodiode is not divided, the focus detection is not performed by using the output signal of the second unit pixel. According to a second exemplary embodiment, driving of the image pickup element is changed in a mode set by the image pickup apparatus, and in a mode in which high speed driving is not performed, the focus detection can be performed by using the output signal of the second unit pixel too.

Figure 6:
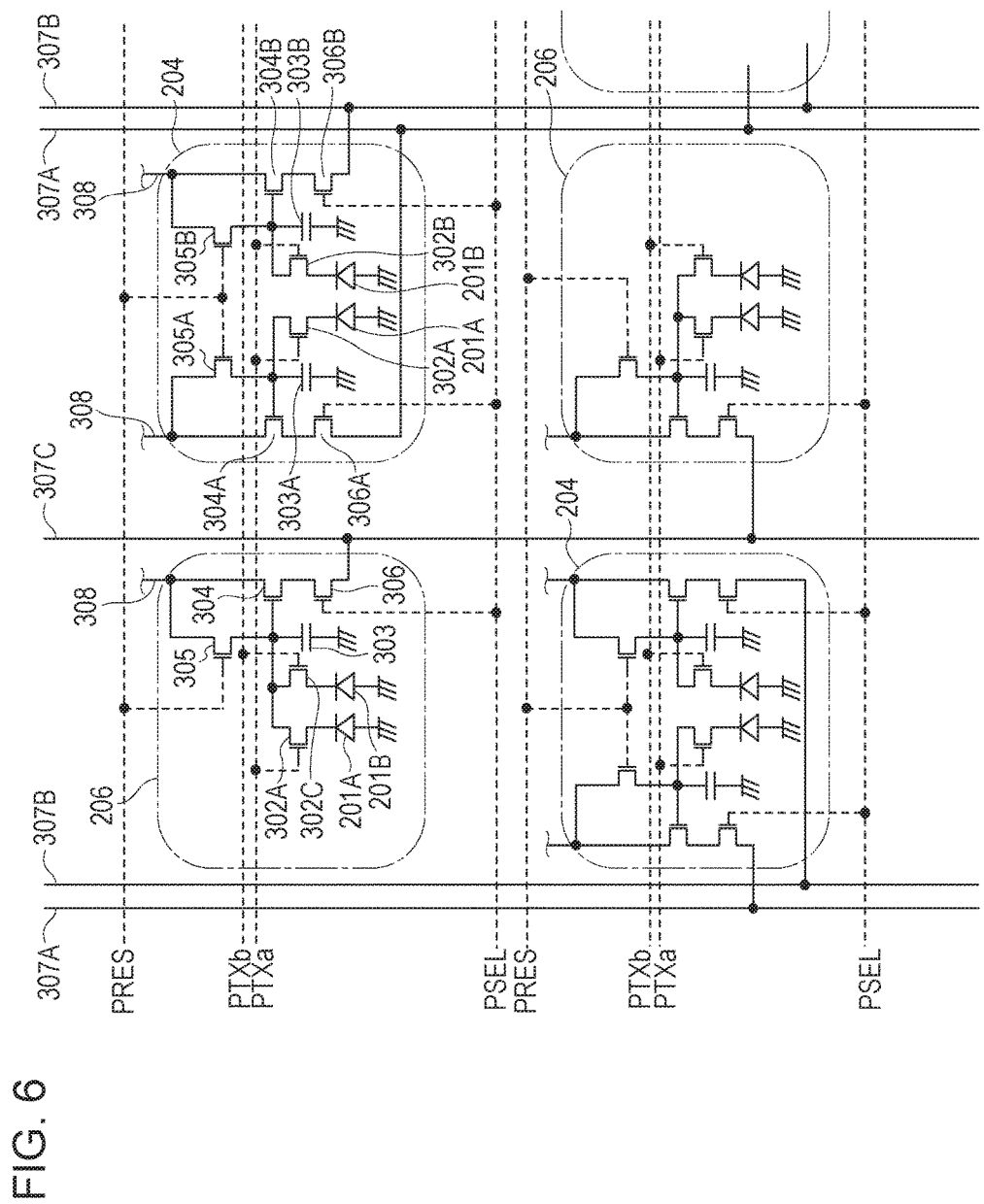
FIG. 6 is a circuit diagram illustrating an internal configuration of the unit pixel according to a second exemplary embodiment.

FIG. 6 is a circuit diagram illustrating a configuration of the unit pixel according to the second exemplary embodiment. FIG. 6 also illustrates pixels in two rows and two columns similarly as in FIG. 3, but in actuality, further more unit pixels are arranged.

Since the first unit pixel 204 has a similar configuration to the configuration described with reference to FIG. 3, descriptions thereof will be omitted here. It should be noted however that, for convenience of the descriptions, the transfer pulse signal PTX used for the transfer control is changed to PTXa. The first unit pixel 204 is connected to the column output lines 307A and 307B similarly as in FIG. 3.

A second unit pixel 206 includes the first photodiode 201A, the second photodiode 201B, the first transfer switch 302A, and a second transfer switch 302C. The second unit pixel 206 also includes the floating diffusion area 303, the amplification unit 304, the reset switch 305, and the selection switch 306.

The first and second photodiodes 201A and 201B function as photoelectric conversion units configured to receive light that has passed through the same micro lens and generate signal charges in accordance with the amount of received light. ON and OFF of the transfer switches 302A and 302C are controlled by the transfer pulse signals PTXa and PTXb, and the charges generated in the photodiodes 201A and 201B are transferred to the common floating diffusion area 303.

The floating diffusion area 303 functions as a charge voltage conversion unit configured to temporarily hold the charges transferred from the photodiodes 201A and 201B and convert the held charges into a voltage signal. The amplification unit 304 is a MOS transistor and functions as a source follower amplifier by being connected to the constant current source 1202 of FIG. 7 which will be described below via the column output line 307C. Then, the voltage signal based on the charges held in the floating diffusion area 303 is amplified to be output as a pixel signal.

Herein, according to the present exemplary embodiment, a pixel signal based on the charges generated in the photodiode 201A of the second unit pixel 206 and transferred to the floating diffusion area 303 is referred to as an A image signal. In addition, a pixel signal based on both the charges generated in the photodiode 201A and transferred to the floating diffusion area 303 and the charges generated in the photodiode 201B and transferred to the floating diffusion area 303B is referred to as an A+B image signal.

ON and OFF of the reset switch 305 are controlled by the reset pulse signal PRES, and the potential of the floating diffusion area 303 is reset to the reference potential VDD supplied from the common power supply 308. ON and OFF of the selection switch 306 are controlled by the selection switch control signal PSEL, and the A image signal and the A+B image signal amplified in the amplification unit 304 are output to the column output line 307C.

The column output line 307C is the second column output line connected to the second unit pixel 206 similarly as in the first exemplary embodiment, and the second column output line is arranged as a column output line different from the above-described first column output line. It should be noted that the column output line 307C is commonly used by a plurality of second unit pixels 206 in different rows and adjacent columns similarly as in FIG. 3. In FIG. 3, the column output line 307C is commonly used by the second unit pixel 206 in the first row and the first column and the second unit pixel in the second row and the second column.

That is, the first unit pixel 204 is connected to the (two in this example) first column output lines corresponding to the number of amplification units (source follower amplifiers) in the pixel (two in this example). The second unit pixel 206 is connected to the (one in this example) second column output line corresponding to the number of amplification units (source follower amplifier) in the pixel (one in this example).

According to the present exemplary embodiment too, the number of first output lines to which the first unit pixel 204 is connected per column is m, and the number of second output lines to which the second unit pixel 206 is connected per column is n, such that a relationship between m and n satisfies m>n. That is, the number of the second column output lines per column is lower than the number of the first column output lines per column.

In addition, it is possible to reduce the number of the first column output lines 307A and 307B to be arranged by adopting the configuration in which the plurality of first unit pixels 204 in the different rows and the adjacent columns commonly use the first column output lines 307A and 307B. Similarly, it is possible to reduce the number of the second output lines 307C to be arranged by adopting the configuration in which the plurality of second unit pixels in the different rows and the adjacent columns commonly use the second output line 307C.

It should be noted that according to the present exemplary embodiment, each unit pixel is provided with the floating diffusion area and the amplification unit (source follower amplifier) as illustrated in FIG. 6, but the disclosure is not limited to the above-described configuration. For example, a configuration may be adopted in which the floating diffusion area and the amplification unit are commonly used by unit pixels in rows where reading times are different from each other.

Figure 12:
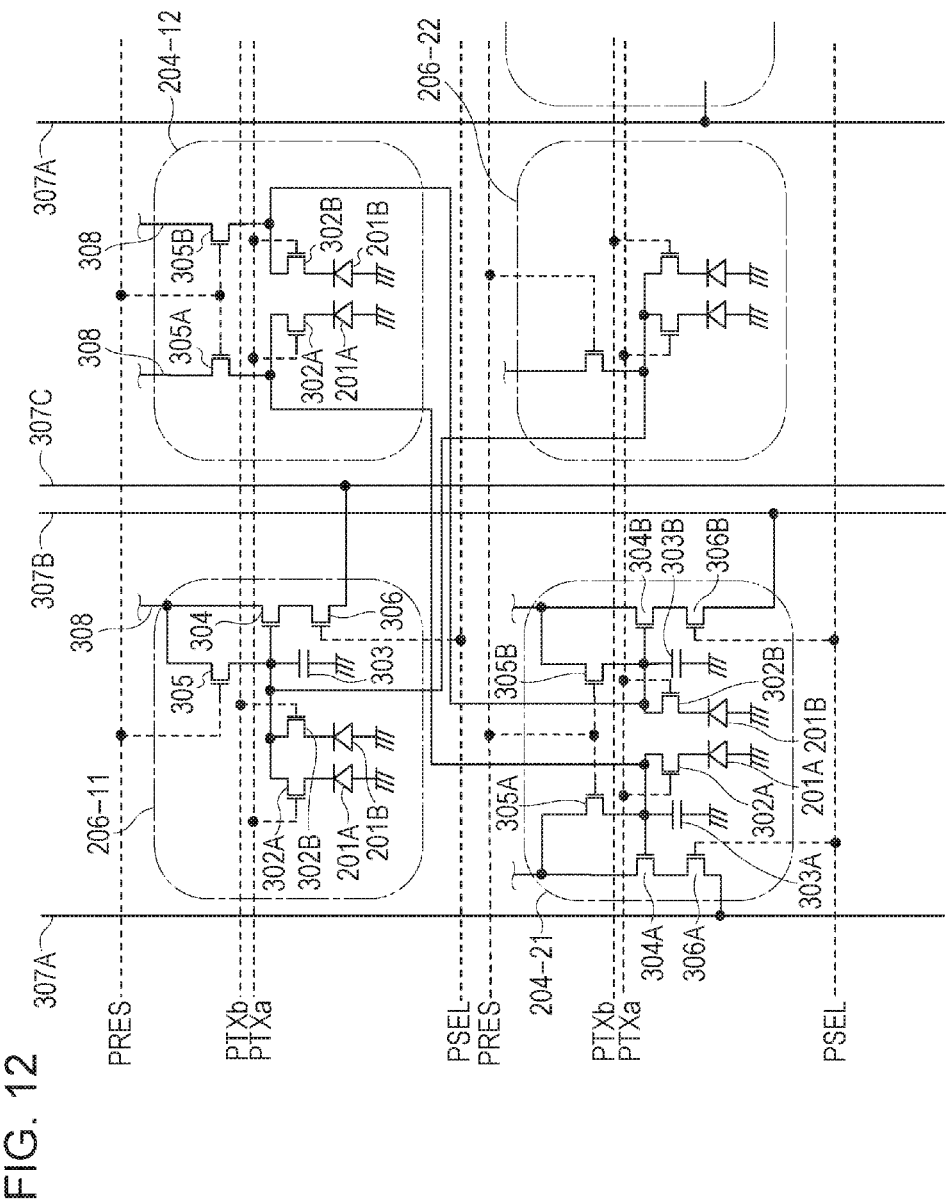
FIG. 12 is a circuit diagram illustrating an internal configuration of the unit pixel according to the second exemplary embodiment.

Specifically, as illustrated in FIG. 12, the first unit pixel 204-12 in the first row and the first unit pixel 204-21 in the second row commonly use the floating diffusion areas 303A and 303B, the amplification units 304A and 304B, and the selection switches 306A and 306B. In addition, when a configuration is adopted in which the second unit pixel 206-11 in the first row and the second unit pixel 206-22 in the second row commonly use the floating diffusion area 303, the amplification unit 304, and the selection switch 306, it is possible to attain a similar effect.

Figure 7:
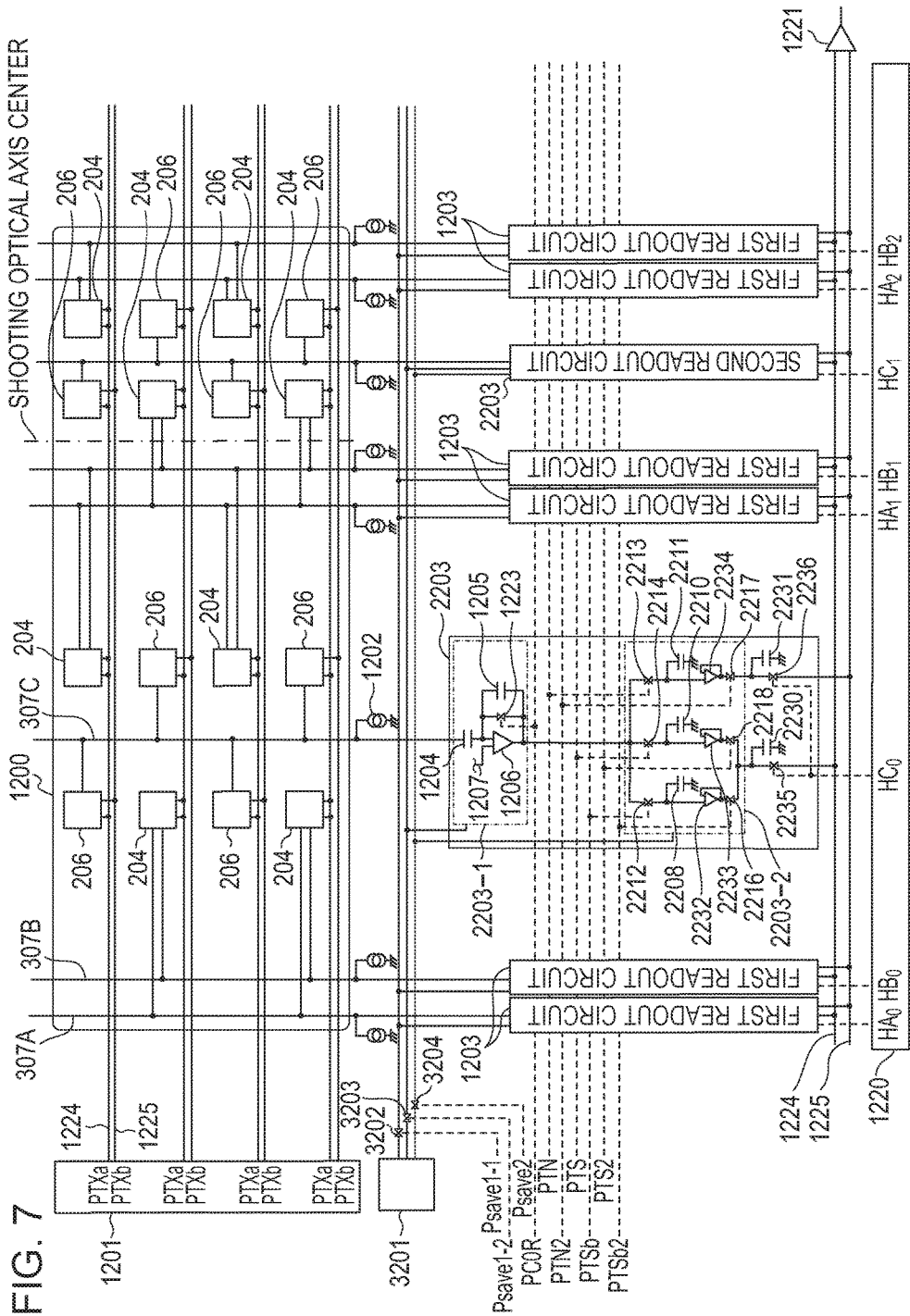
FIG. 7 illustrates a circuit configuration of the image pickup element according to the second exemplary embodiment.

Next, FIG. 7 illustrates an example circuit configuration of the image pickup element according to the second exemplary embodiment. Similarly as in the first exemplary embodiment, a plurality of unit pixels (the first unit pixel 204 and the second unit pixel 206 described with reference to FIG. 6) are arranged in rows and columns in the pixel area 1200. It should be noted that, herein, 4×4 pixels are illustrated to simplify the explanation, but in actuality, further more unit pixels are arranged. In FIG. 7, descriptions will be given of parts different from FIG. 4. It should be noted that the same reference symbols are basically assigned to the parts similar to those of FIG. 4, and the descriptions thereof will be omitted.

The vertical shift register 1201 performs the vertical scanning by transmitting the driving pulse for each pixel in the respective rows. It should be noted that a driving signal line 1225 from which the transfer pulse signal PTXb is transmitted is arranged in addition to a driving signal line 1224 from which the transfer pulse signal PTXa equivalent to the transfer pulse signal PTX described with reference to FIG. 4 is transmitted.

The driving signal line 1225 corresponds to the second transfer switch 302C of the second unit pixel 206 illustrated in FIG. 6. It should be noted that the driving signal lines 1224 and 1225 from which the transfer pulse signals PTXa and PTXb are transmitted are illustrated similarly as in FIG. 4, but in actuality, a plurality of driving signal lines from which the reset pulse signal PRES, the selection switch control signal PSEL, and the like are transmitted are also connected for each row.

The transfer pulse signal PTXa transmitted from the vertical shift register 1201 controls ON and OFF of the transfer switches 302A and 302B, and the transfer pulse signal PTXb controls ON and OFF of the transfer switch 302C.

With regard to the configuration other than the above-described configuration, the first unit pixel 204 has the same configuration as that described with reference to FIG. 4 including the readout circuit 1203, and the descriptions thereof will be omitted. It should be noted that the readout circuit 1203 will be referred to as a "first readout circuit 1203" for convenience of the descriptions according to the present exemplary embodiment.

The second unit pixel 206 outputs the pixel signals obtained from the respective divided photodiodes to the column output line 307C. The signals from the second unit pixel 206 are input to a second read out circuit 2203 arranged in each column via the column output line 307C. Then, the signals processed in the second readout circuit 2203 are sequentially output to the output amplifier 1221 by the horizontal shift register 1220 configured to perform the horizontal scanning. The constant current source 1202 is connected to the column output lines 307A, 307B, and 307C.

The second read out circuit 2203 is provided to each of the column output lines 307C. Since the configurations of the respective second readout circuits 2203 are common to one another, only one circuit is illustrated in detail in FIG. 7. It should be noted that the same configuration as that of the readout circuit 1203 described with reference to FIG. 4 is basically assigned with the same reference symbol.

A column amplifier circuit 2203-1 includes the clamp capacitance 1204, the feedback capacitance 1205, the column amplifier 1206, the reference voltage source 1207, and the switch 1223.

The column amplifier 1206 amplifies a signal voltage on the column output line 307. The reference voltage source 1207 supplies the reference voltage Vref of the column amplifier. The switch 1223 is controlled by the PC0R signal. When the switch 1223 is turned on, both ends of the feedback capacitance 1205 are short-circuited. In a case where a capacitance of the clamp capacitance 1204 is set as C0 and a capacitance of the feedback capacitance 1205 is set as Cf, an amplification factor of the column amplifier 1206 is set as C0/Cf.

The power supply circuit 3201 supplies power to the column amplifier circuit 2203-1. A supply voltage from the power supply circuit 3201 is supplied to the column amplifier circuit 2203-1 via the power supply switch 3202. ON and OFF of the power supply switch 3202 are controlled by a Psave1-2 signal.

Specifically, in a case where the Psave1-2 signal is the Low level, power is supplied to the column amplifier circuit 2203-1. In a case where the Psave1-2 signal is the High level, the power supply to the column amplifier circuit 2203-1 is interrupted to save power.

First capacitances 2208, 2210, and 2211 hold signal voltages. Switches 2212, 2214, and 2213 respectively control writing to the capacitances 2208, 2210, and 2211, respectively. ON and OFF of the switch 2212 are controlled by the PTSb signal, and ON and OFF of the switch 2214 are controlled by the PTS signal. ON and OFF of the switch 2213 are controlled by the PTN signal.

Second capacitances 2230 and 2231 are holding units configured to hold signal voltages. The second capacitances 2230 and 2231 are provided to perform the writing of the signals to the first capacitances 2208, 2210, and 2211 and the horizontal scanning by the horizontal shift register 1220 at the same time.

Switches 2216, 2217, and 2218 respectively controls the writing to the second capacitances 2230 and 2231. ON and OFF of the switch 2216 are controlled by a PTSb2 signal, and the signal of the capacitance 2208 is written in the capacitance 2230. ON and OFF of the switch 2218 are controlled by a PTS2 signal, and the signal of the capacitance 2210 is written in the capacitance 2230. ON and OFF of the switch 2217 are controlled by a PTN2 signal the signal of the capacitance 2211 is written in the capacitance 2231.

Voltage follower circuits 2232, 2233, and 2234 functioning as buffers are provided immediately before the second capacitances 2230 and 2231. The voltage follower circuits 2232, 2233, and 2234 have a function of transmitting the potential equal to the potential accumulated in the first capacitances to the second capacitances 2230 and 2231 without depending on capacitance division.

The switches 2212 to 2214 and 2216 to 2218 and the voltage follower circuits 2232, 2233, and 2234 constitute a buffer circuit 2203-2. The power supply circuit 3201 supplies power to the buffer circuit 2203-2 via a power supply switch 3204. ON and OFF of the power supply switch 3204 are controlled by a Psave2 signal.

Specifically, in a case where the Psave2 signal is the Low level, power is supplied to the buffer circuit 2203-2. In a case where the Psave1-2 signal is the High level, the power supply to the buffer circuit 2203-2 is interrupted to save power.

ON and OFF of switches 2235 and 2236 are controlled by the PH signal from the horizontal shift register 1220. When the switch 2235 is turned on, the signal written in the capacitance 2230 is output to the output amplifier 1221 via the common output line 1224. When the switch 2236 is turned on, the signal written in the capacitance 2231 is output to the output amplifier 1221 via the common output line 1225.

Figure 8:
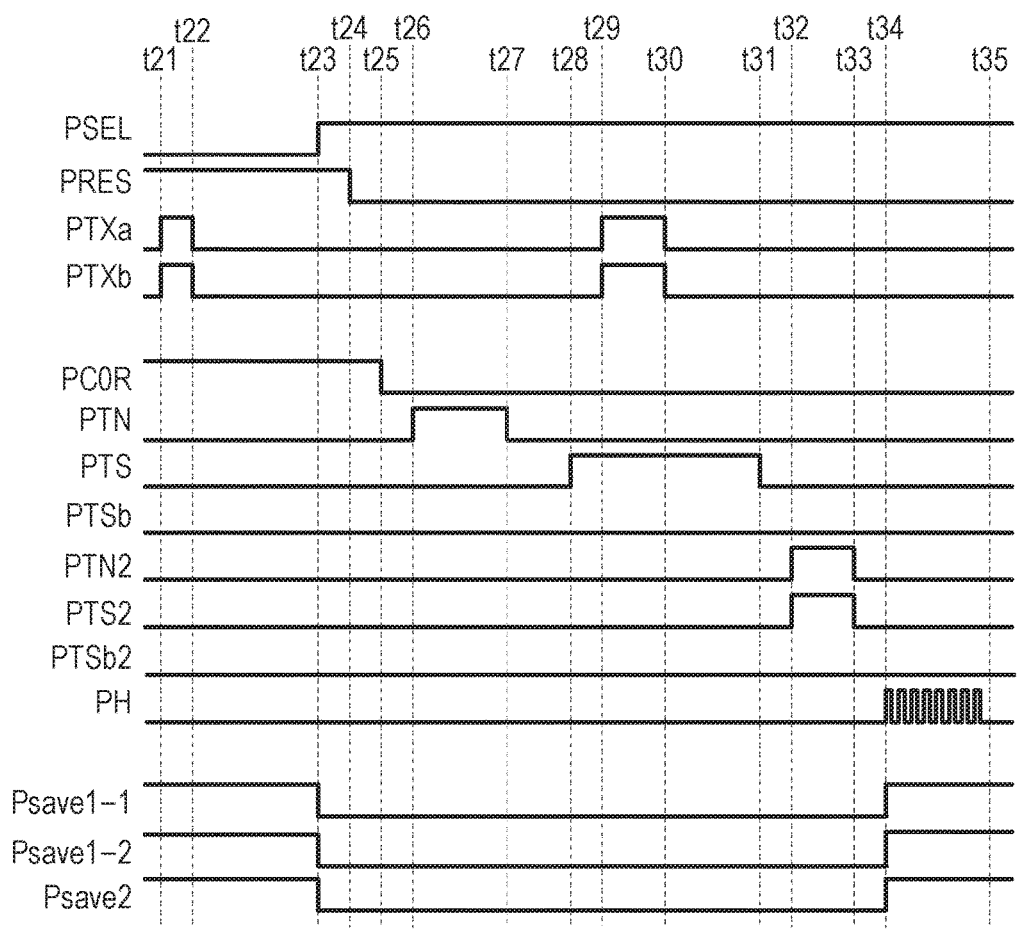
FIG. 8 is a timing chart illustrating a first driving method according to the second exemplary embodiment.

Next, a first driving method of reading out the pixel signal will be described with reference to FIG. 8. FIG. 8 illustrates a driving sequence for one row.

First, the selection switch control signal PSEL is set to the Low level to turn off the selection switches 306, 306A, and 306B, and the reset pulse signal PRES is set to the High level to turn on the reset switches 305, 305A, and 305B. Then, the floating diffusion areas 303, 303A, and 303B are reset.

At the time T=t21, the transfer pulse signals PTXa and PTXb are set to the High level to turn on the transfer switches 302A, 302B, and 302C and reset the photodiodes 201A and 201B. At the time T=t22, the transfer pulse signals PTXa and PTXb are set to the Low level to cancel the reset state and start accumulation of light charges in the photodiodes 201A and 201B.

After the accumulation is performed for a predetermined time, at the time T=t23, the Psave1-1 signal, the Psave1-2 signal, and the Psave2 signal are set to the Low level. Then, power is supplied to the column amplification circuit 1203-1 of the first readout circuit 1203 and the column amplifier circuit 2203-1 and the buffer circuit 2203-2 of the second read out circuit 2203. Furthermore, the selection switch control signal PSEL is set to the High level to turn on the selection switches 306, 306A, and 306B. At the time T=t24, the reset pulse signal PRES is set to the Low level to turn off the reset switches 305, 305A, and 305B and cancel the resetting of the floating diffusion areas 303, 303A, and 303B. The potentials of the floating diffusion areas 303, 303A, and 303B at this time are amplified by the amplification units 304, 304A, and 304B to be read out as reset signals to the column output lines 307A, 307B, and 307C. The read reset signals are input to the first readout circuit 1203 and the second read out circuit 2203.

When the reset signal is input, the PC0R signal is set to the High level in the first readout circuit 1203 and the second read out circuit 2203. The switch 1223 is turned on, and a state is established in which the column amplifier 1206 buffers the reference voltage Vref supplied from the reference voltage source 1207. Then, the feedback capacitance 1205 is reset, and also, the reset signal is clamped in the clamp capacitance 1204.

Thereafter, at the time T=t25, the PC0R signal is set to the Low level to turn off the switch 1223. At the time T=t26, the PTN signal is set to the High level to turn on the switches 1215 and 2213 and write the reset signal in the capacitances 1211 and 2211. Thereafter, at the time T=t27, the PTN signal is set to the Low level to turn off the switches 1215 and 2213.

Next, at the time T=t28, the PTS signal is set to the High level to turn on the switches 1214 and 2214. Subsequently, at the time T=t29, the transfer pulse signals PTXa and PTXb are set to the High level to turn on the transfer switches 302A, 302B, and 302C. Then, the light charges of the photodiodes 201A and 201B are transferred to the floating diffusion areas 303, 303A, and 303B.

Then, in the first unit pixel 204, the potentials based on the charges of the photodiodes 201A and 201B transferred to the floating diffusion areas 303A and 303B are amplified by the amplification units 304A and 304B. The pixel signals amplified by the amplification units 304A and 304B are output to the column output lines 307A and 307B to be input to the readout circuit 1203. Then, the pixel signal amplified by the column amplifier 1206 of the readout circuit 1203 is written in the capacitance 1210.

In the second unit pixel 206, the charges transferred from the photodiodes 201A and 201B are combined with each other in the floating diffusion area 303, and a potential based on the combined charges is amplified by the amplification unit 304. The pixel signal amplified by the amplification unit 304 is output to the column output line 307C to be input to the second readout circuit 2203. Then, the pixel signal amplified by the column amplifier 1206 of the second readout circuit 2203 is written in the capacitance 2210.

Thereafter, at the time T=t30, the transfer pulse signals PTXa and PTXb are set to the Low level to turn off the transfer switches 302A, 302B, and 302C, and at the time T=t31, the PTS signal is set to the Low level to turn off the switches 1214 and 2214.

The signal to be read out to the first readout circuit 1203 is confirmed in this stage. For this reason, power may be saved by turning off the circuit power circuit that is not used in the signal holding and the horizontal scanning that will be performed later in the first readout circuit 1203.

Subsequently, at the time T=t32, the PTN2 signal and the PTS2 signal are set to the High level at the same time to turn on the switches 2217 and 2218. Then, the reset signals held in the capacitance 2211 are written in the capacitance 2231 via the voltage follower 2234. In addition, the pixel signals held in the capacitance 2210 are written in the capacitance 2230 via the voltage follower 2233. Then, at the time T=t33, the PTN2 signal and the PTS2 signal are set to the Low level at the same time to end the writing. The signal to be read out of the second read out circuit 2203 is confirmed in this stage.

Thereafter, at the time T=t34, the Psave1-1 signal, the Psave1-2 signal, and the Psave2 signal are set to the High level. Then, the power supply to the column amplification circuit 1203-1 of the readout circuit 1203 and the column amplifier circuit 2203-1 and the buffer circuit 2203-2 of the second read out circuit 2203 is interrupted to save power.

At the time T=t34 to t35, the horizontal scanning is performed. That is, the driving pulse PH of the horizontal shift register 1220 is sequentially set to the Low level→the High level→the Low level for each readout circuit to perform a control such that the switches 1218 and 1219 and the switches 2235 and 2236 are sequentially turned off→on→off.

As a result, the reset signals held in the capacitance 1210 or the capacitance 2231 are sequentially read out to the common output line 1225, and also the pixel signals held in the capacitance 1211 or the capacitance 2230 are sequentially read out to the common output line 1224. Then, a difference (difference voltage) between the pixel signals and the reset signals which are read out for one row is output from the output amplifier 1221. It should be noted that the common output lines 1224 and 1225 are reset to the reference potential by the reset switch that is not illustrated in the drawing each time the signals in each column are read out.

It should be noted that, similarly as in the first exemplary embodiment, while the A image output and the B image output obtained from the first unit pixel 204 are used, the computation of the phase difference detection for the focus detection is performed by the image processing circuit 106 and the like in the subsequent stage. Furthermore, the combination processing of the A image output and the B image output is performed, and the result is used together with the output obtained from the second unit pixel 206, so that the image data is generated.

It should be noted that, according to the configuration of the present exemplary embodiment too, the output of the column output line 307A corresponds to the first output pixel at the output timing in the first row, and the output of the column output line 307C corresponds to the first output pixel at the output timing in the second row. With regard to the above-described shift in the output timings too, similarly as in the first exemplary embodiment, the alignment processing is performed by a circuit in a subsequent stage such as the digital signal processing circuit 105 such that the displacement as the image does not occur.

Figure 9:
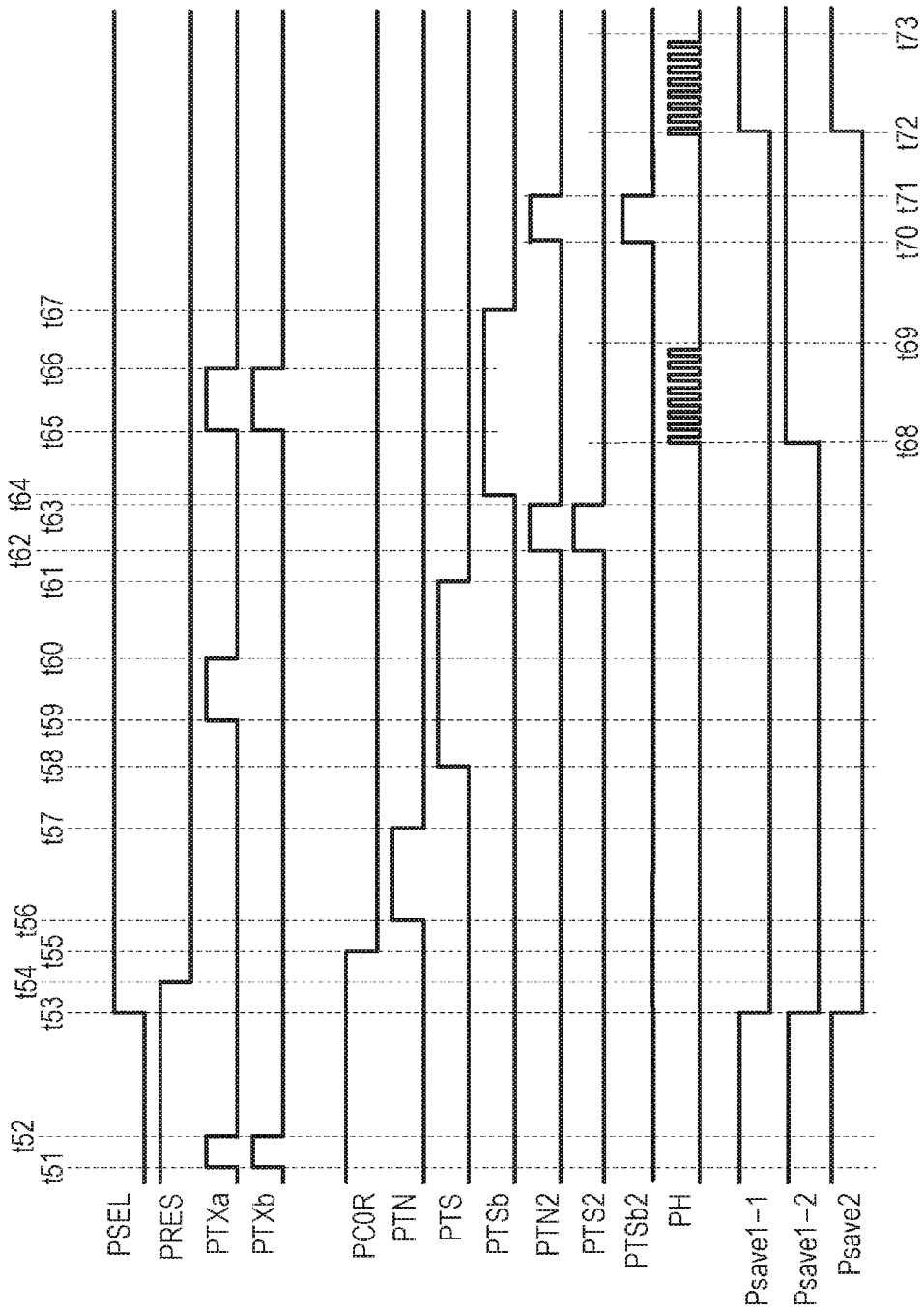
FIG. 9 is a timing chart illustrating a second driving method according to the second exemplary embodiment.

Next, a second driving method of reading out the pixel signal will be described with reference to FIG. 9. FIG. 9 illustrates a driving sequence for one row.

First, the selection switch control signal PSEL is set to the Low level turn off the selection switches 306, 306A, and 306B, and the reset pulse signal PRES is set to the High level to turn on the reset switches 305, 305A, and 305B. Then, the floating diffusion areas 303, 303A, and 303B are reset.

At the time T=t51, the transfer pulse signals PTXa and PTXb are set to the High level to turn on the transfer switches 302A, 302B, and 302C and reset the photodiodes 201A and 201B. At the time T=t52, the transfer pulse signals PTXa and PTXb are set to the Low level to cancel the reset state and start the accumulation of the light charges in the photodiodes 201A and 201B.

After the accumulation is performed for a predetermined time, at the time T=t53, the Psave1-1 signal, the Psave1-2 signal, and the Psave2 signal are set to the Low level. Then, power is supplied to the column amplification circuit 1203-1 of the first readout circuit 1203 and the column amplifier circuit 2203-1 and the buffer circuit 2203-2 of the second read out circuit 2203. Furthermore, the selection switch control signal PSEL is set to the High level to turn on the selection switches 306, 306A, and 306B. At the time T=t54, the reset pulse signal PRES is set to the Low level to turn off the reset switches 305, 305A, and 305B to cancel resetting of the floating diffusion areas 303, 303A, and 303B. The potentials of the floating diffusion areas 303, 303A, and 303B at this time are amplified by the amplification units 304, 304A, and 304B to be read out as reset signals to the column output lines 307A, 307B, and 307C. The read reset signals are input to the first readout circuit 1203 and the second read out circuit 2203.

When the reset signal is input, the PC0R signal is set to the High level in the first readout circuit 1203 and the second read out circuit 2203. The switch 1223 is turned on, and a state is established in which the column amplifier 1206 buffers the reference voltage Vref supplied from the reference voltage source 1207. Then, the feedback capacitance 1205 is reset, and also, the reset signal is clamped in the clamp capacitance 1204.

Thereafter, at the time T=t55, the PC0R signal is set to the Low level to turn off the switch 1223, and at the time T=t56, the PTN signal is set to the High level to turn on the switches 1215 and 2213 to write the reset signals in the capacitances 1211 and 2211. Thereafter, at the time T=t57, the PTN signal is set to the Low level to turn off the switches 1215 and 2213.

Next, at the time T=t58, the PTS signal is set to the High level to turn on the switches 1214 and 2214. Subsequently, at the time T=t59, the transfer pulse signal PTXa is set to the High level to turn on the transfer switches 302A and 302B. Then, the light charges of the photodiodes 201A and 201B of the first unit pixel 204 and the photodiode 201A of the second unit pixel 206 are transferred to the floating diffusion areas 303, 303A, and 303B.

Then, in the first unit pixel 204, the potentials based on the charges of the photodiodes 201A and 201B transferred to the floating diffusion areas 303A and 303B are amplified by the amplification units 304A and 304B. The pixel signals amplified by the amplification units 304A and 304B are output to the column output lines 307A and 307B to be input to the readout circuit 1203. Then, the pixel signal amplified by the column amplifier 1206 of the readout circuit 1203 is written in the capacitance 1210.

In the second unit pixel 206, the potential based on the charges of the photodiode 201A transferred to the floating diffusion area 303 is amplified by the amplification unit 304. The pixel signal amplified by the amplification unit 304 is output to the column output line 307C to be input to the second readout circuit 2203. Then, the pixel signal amplified by the column amplifier 1206 of the second readout circuit 2203 is written in the capacitance 2210.

Thereafter, at the time T=t60, the transfer pulse signal PTXa is set to the Low level to turn off the transfer switches 302A and 302B, and at the time T=t61, the PTS signal is set to the Low level to turn off the switches 1214 and 2214.

The signal to be read out to the first readout circuit 1203 is confirmed in this stage. For this reason, power may be saved by turning off the circuit power circuit that is not used in the signal holding and the horizontal scanning that will be performed later in the first readout circuit 1203.

Next, at the time T=t62, the PTN2 signal and the PTS2 signal are set to the High level at the same time to turn on the switches 2217 and 2218, and the signals held in the capacitance 2211 are written in the capacitance 2231 via the voltage follower circuit 2234. In addition, the signals held in the capacitance 2210 are written in the capacitance 2230 via the voltage follower circuit 2233. Then, at the time T=t63, the PTN2 signal and the PTSb2 signal are set to the Low level to end the writing. The signal of the photodiode 201A of the second unit pixel 206 (the A image signal) read to the second read out circuit 2203 is confirmed in this stage.

Subsequently, at the time T=t64, the PTSb signal is set to the High level to turn on the switch 2212. At the time T=t65, the transfer pulse signal PTXa is set to the High level again to turn on the transfer switch 302A, and at the same time, the transfer pulse signal PTXb is also set to the High level to turn on the transfer switch 302C. As a result, it is possible to transfer the light charges of the photodiodes 201A and 201B of the second unit pixel 206 to the floating diffusion area 303 at the same time.

In the second unit pixel 206, the charges transferred from the photodiodes 201A and 201B are combined with each other in the floating diffusion area 303, and a potential based on the combined charges is amplified by the amplification unit 304. The pixel signal amplified by the amplification unit 304 is output to the column output line 307C to be input to the second readout circuit 2203. Then, the pixel signal amplified by the column amplifier 1206 of the second readout circuit 2203 is written in the capacitance 2208.

Thereafter, at the time T=t66, the transfer pulse signals PTXa and PTXb are set to the Low level to turn off the transfer switches 302A and 302C, and at the time T=t66, the PTSb signal is set to the Low level to turn off the switch 2212. The signal of the photodiodes 201A and 201B of the second unit pixel (the A+B image signal) read to the second read out circuit 2203 is confirmed in this stage.

Subsequently, at the time T=t68, the Psave1-1 signal and the Psave1-2 signal are set to the High level. The power supply to the column amplification circuit 1203-1 of the first readout circuit 1203 and the column amplifier circuit 2203-1 of the second read out circuit 2203 is interrupted to save power.

That is, after the output of the first unit pixel 204 is transferred to the capacitance 1210 and the capacitance 1211 in the first readout circuit 1203, the power supply to part of the circuit (the column amplification circuit 1203-1) in the first readout circuit 1203 is turned off to suppress the power consumption. At the same time, after the output of the second unit pixel 206 is transferred to the capacitances 2210, 2208, and 2211 in the second read out circuit 2203, the power supply to part of the circuit (the column amplifier circuit 2203-1) in the second read out circuit 2203 is turned off to suppress the power consumption.

At the time T=t68 to t69, the horizontal scanning is performed on the A image signal and the B image signal of the first unit pixel 204 and the A image signal of the second unit pixel 206. That is, the driving pulse PH of the horizontal shift register 1220 is sequentially set to the Low level→the High level→the Low level for each readout circuit to perform a control such that the switches 1218 and 1219 and the switches 2235 and 2236 are sequentially turned off→on→off.

As a result, the reset signals held in the capacitance 1211 or 2231 are sequentially read out to the common output line 1224, and also the pixel signals held in the capacitance 1210 or 2230 are sequentially read out to the common output line 1225. Then, a difference (difference voltage) between the pixel signals and the reset signals which are read out for one row is output from the output amplifier 1221. It should be noted that the common output lines 1224 and 1225 are reset to the reference potential by the reset switch that is not illustrated in the drawing each time the signals in each column are read out.

Subsequently, after the writing of the A+B image signal in the capacitance 2208 is ended, at the time T=t70 and subsequent time, the writing of the A+B image signal in the capacitance 2230 and the horizontal scanning of the A+B image signal are performed. At the time T=t70, when the PTN2 signal and the PTSb2 signal are set to the High level at the same time, the switches 2216 and 2217 are turned on, and the reset signals held in the capacitance 2211 are written in the capacitance 2231 via the voltage follower 2234.

The pixel signals held in the capacitance 2208 are written in the capacitance 2230 via the voltage follower 2232. Then, at the time T=t71, the PTN2 signal and the PTSb2 signal are set to the Low level at the same time to end the writing. The combined signal of the photodiodes 201A and 201B of the second unit pixel 206 read to the second readout circuit 1203 (the A+B image signal) is confirmed in this stage.

Thereafter, at the time T=t72, the Psave2 signal is set to the High level, and the power supply to the buffer circuit 2203-2 in the second read out circuit 2203 is interrupted to save power. During the time T=t72 to t73, the driving pulse PH of the horizontal shift register 1220 is sequentially set to the Low level→the High level→the Low level for each readout circuit to perform a control such that the switches 1218 and 1219 and the switches 2235 and 2236 are sequentially turned off→on→off.

As a result, the reset signals held in the capacitance 2231 are sequentially read out to the common output line 1225, and also the pixel signals held in the capacitance 2230 are sequentially read out to the common output line 1224. Then, a difference (difference voltage) between the pixel signals and the reset signals which are read out for one row is output from the output amplifier 1221. This output corresponds to the A+B image signal of the second unit pixel.

When the above-described operation is repeatedly performed for all of the rows, it is possible to perform the accumulation and the signal readout of all of the pixels. It should be noted that the common output lines 1224 and 1225 are reset to the reference potential by the reset switch that is not illustrated in the drawing each time the signals in each column are read out.

In the first driving described with reference to FIG. 8, similarly as in the first exemplary embodiment, while the A image output and the B image output obtained from the first unit pixel 204 are used, the computation of the phase difference detection for the focus detection is performed by the image processing circuit 106 and the like in the subsequent stage. Furthermore, the combination processing (addition processing) of the A image output and the B image output is performed, and the result is used together with the output obtained from the second unit pixel 206 to generate the image data.

In the second driving described with reference to FIG. 9, each of the second unit pixels 206 mixes and outputs the signals of the N photoelectric conversion units with one another as the A+B image output and also outputs part of signals of the N photoelectric conversion units as the A image output. Furthermore, the image processing circuit 106 or the like in a stage subsequent computes a difference between the A+B image output and the A image output from the A image output and the A+B image output of the second unit pixel 206 to obtain the B image output. It is possible to perform the computation of the phase difference detection for the focus detection by using not only the A image output and the B image output obtained from the first unit pixel 204 but also the A image output and the B image output obtained from the second unit pixel 206. Furthermore, it is possible to generate the image data by using the A+B image output of the second unit pixel 206. In this manner, according to the second driving, the number of readout operations is higher than that of the first driving, and it takes time to perform the readout, but it is possible to obtain the A image output and the B image output corresponding to the phase difference images for the focus detection of the second unit pixel which is not obtained in the first driving.

The output timings of the first unit pixel and the second unit pixel are shifted from each other in the odd-numbered rows (such as the first row and the third row) and the even-numbered rows (such as the second row and the fourth row). For this reason, the alignment processing is performed by a circuit in a subsequent stage (for example, the digital signal processing circuit 105 or the like) to perform the processing such that the displacement does not occur as the image similarly as in the other driving.

Figure 10:
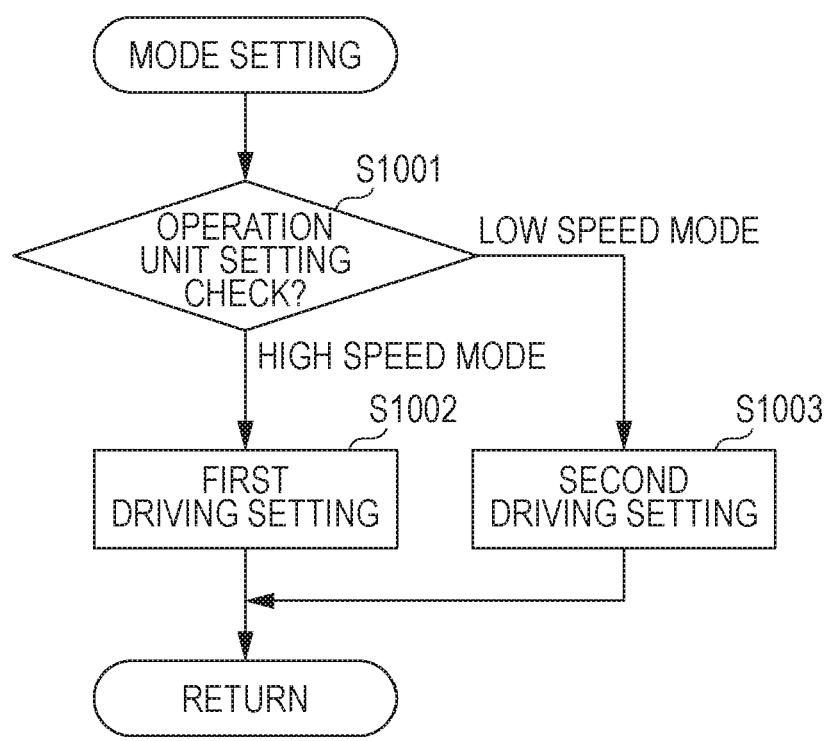
FIG. 10 is a flow chart related to driving switching according to the second exemplary embodiment.

FIG. 10 is a flow chart illustrating an example of a switching operation between the first driving and the second driving of the image pickup apparatus according to the present exemplary embodiment.

In step S1001, the operation circuit 110 determines the shooting mode described with reference to FIG. 1 set by the operation member that is not illustrated to be transmitted to the control circuit 109. That is, the operation circuit 110 determines whether the shooting mode is the "high speed shooting mode" in which a frame rate and a continuous shoot speed are prioritized or the "low speed shooting mode" in which a shooting precision is prioritized over the frame rate.

In step S1001, in a case where the operation circuit 110 determines that the "high speed shooting mode" is set, the flow proceeds to step S1002, and the control circuit 109 sets the image pickup element to drive in accordance with the first driving.

In step S1003, in a case where the operation circuit 110 determines that the "low speed shooting mode" is set, the flow proceeds to step S1003, and the control circuit 109 sets the image pickup element to drive in accordance with the second driving.

While the control is performed in the above-described manner, it is possible to provide the image pickup apparatus having the well-balanced configuration in terms of the fast shooting capability and the precision by switching the driving setting of the image pickup element in accordance with the wanted shooting mode.

In a case where the pixel array is constituted by only the first unit pixels and a plurality of column output lines from which the signals of the first unit pixels are output are provided per column, the area occupied by the column output lines in the image pickup element is increased, and the photodiode area is reduced. Thus, deterioration in the light receiving characteristic and saturation characteristic of the pixels are concerned. In view of the above, according to the above-described first and second exemplary embodiments, the image pickup element is constituted by the first unit pixels and the second unit pixels, and the number of the second column output lines per column from which the signals of the second unit pixels are output is set to be lower than the number of the first column output lines per column from which the signals of the first unit pixels are output. Accordingly, it is possible to realize the high speed signal readout while the area occupied by the photodiodes is secured in the image pickup element in which the plurality of photoelectric conversion units are provided in the single unit pixel.

Other Exemplary Embodiment

The exemplary embodiments can also be realized by the following processing. That is, a program for realizing one or more functions of the above-described exemplary embodiments is supplied to a system or an apparatus via a network or a storage medium, and one or more processors in the system or the apparatus read out the program to be executed. In addition, the exemplary embodiments can also be realized by a circuit (for example, an ASIC) that realizes one or more functions.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-044018, filed Mar. 5, 2015, which is hereby incorporated by reference herein in its entirety.

What is claimed is:

1. An image pickup element comprising:
a pixel array in which a plurality of first unit pixels each including M photoelectric converters (M is a natural number higher than or equal to 2) and a plurality of second unit pixels each including N photoelectric converters (N is a natural number lower than M) are arranged in rows and columns;
a first column output line arranged for each column of the pixel array,
wherein signals of the first unit pixels are output to the first column output line; and
a second column output line that is different from the first column output line and arranged for each column of the pixel array,
wherein signals of the second unit pixels are output to the second column output line,
wherein the first column output line is shared by the first unit pixels of adjacent columns for outputting signals of the first unit pixels of adjacent columns, and the second column output line is shared by the second unit pixels of adjacent columns for outputting signals of the second unit pixels of adjacent columns,
wherein the number of the second column output lines per column is lower than the number of the first column output lines per column.

2. The image pickup element according to claim 1, wherein the first unit pixels and the second unit pixels are alternately arranged in a row direction and a column direction in the pixel array.

3. The image pickup element according to claim 1, wherein each of the first unit pixels and the second unit pixels includes one micro lens.

4. The image pickup element according to claim 1, wherein the pixel array includes color filters regularly arranged, and the first unit pixel and the second unit pixel include color filters having different spectral transmittance.

5. The image pickup element according to claim 4, wherein the first unit pixel includes the color filter through which green light transmits the most.

6. The image pickup element according to claim 1, wherein each of the first unit pixels separately outputs signals of the M photoelectric converters.

7. The image pickup element according to claim 1, wherein the image pickup device has a first mode in which each of the first unit pixels mixes and outputs signals of the M photoelectric converters and a second mode in which each of the first unit pixels outputs part of the signals of the M photoelectric converters.

8. The image pickup element according to claim 1, wherein a pixel signal output from each of the first unit pixels is used to perform focus control by phase difference detection.

9. The image pickup element according to claim 1, wherein a pixel signal output from each of the first unit pixels and the second unit pixels is used to perform image generation.

10. An image pickup apparatus comprising:
a pixel array in which a plurality of first unit pixels each including M photoelectric converters (M is a natural number higher than or equal to 2) and a plurality of second unit pixels each including N photoelectric converters (N is a natural number lower than M) are arranged in rows and columns;
a first column output line arranged for each column of the pixel array,
wherein signals of the first unit pixels are output to the first column output line; and
a second column output line that is different from the first column output line and arranged for each column of the pixel array,
wherein signals of the second unit pixels are output to the second column output line,
an image processor that applies predetermined image processing to pixel signals output from the first column output lines and second column output lines; and
a controller that performs focus control using the pixel signals of the first unit pixels,
wherein the first column output line is shared by the first unit pixels of adjacent columns for outputting signals of the first unit pixels of adjacent columns, and the second column output line is shared by the second unit pixels of adjacent columns for outputting signals of the second unit pixels of adjacent columns,
wherein the number of the second column output lines per column is lower than the number of the first column output lines per column.

* * * * *